(12) United States Patent
Bretschneider et al.

(10) Patent No.: US 12,093,016 B2
(45) Date of Patent: Sep. 17, 2024

(54) NUMERICAL CONTROLLER WHICH CAN BE PARAMETRISED BY THE MACHINE MANUFACTURER

(71) Applicant: Siemens Aktiengesellschaft, Munich (DE)

(72) Inventors: Jochen Bretschneider, Owingen (DE); Steffen Mihatsch, Renningen (DE)

(73) Assignee: Siemens Aktiengesellschaft, Munich (DE)

( * ) Notice: Subject to any disclaimer, the term of this patent is extended or adjusted under 35 U.S.C. 154(b) by 362 days.

(21) Appl. No.: 17/764,049

(22) PCT Filed: Sep. 15, 2020

(86) PCT No.: PCT/EP2020/075758
§ 371 (c)(1),
(2) Date: Mar. 25, 2022

(87) PCT Pub. No.: WO2021/058333
PCT Pub. Date: Apr. 1, 2021

(65) Prior Publication Data
US 2022/0373994 A1   Nov. 24, 2022

(30) Foreign Application Priority Data
Sep. 27, 2019   (EP) ..................................... 19200125

(51) Int. Cl.
*G05B 19/4093* (2006.01)
(52) U.S. Cl.
CPC .................. *G05B 19/40931* (2013.01); *G05B 2219/35012* (2013.01); *G05B 2219/45161* (2013.01)
(58) Field of Classification Search
None
See application file for complete search history.

(56) References Cited

U.S. PATENT DOCUMENTS

| 2006/0064385 A1 | 3/2006 | Susnjara ................ G06Q 99/00 |
| 2007/0005178 A1 | 1/2007 | Prestidge et al. |

(Continued)

FOREIGN PATENT DOCUMENTS

| CN | 102637016 A | 8/2012 | |
| CN | 102789206 A | 11/2012 | ........... G05B 19/414 |

(Continued)

OTHER PUBLICATIONS

PCT International Search Report and Written Opinion of International Searching Authority mailed Nov. 17, 2020 corresponding to PCT International Application No. PCT/EP2020/075758 filed Sep. 15, 2020.

*Primary Examiner* — Ryan A Jarrett
(74) *Attorney, Agent, or Firm* — Henry M. Feiereisen LLC

(57) ABSTRACT

A numerical controller executes a system program. While executing the system program, the numerical controller executes a sub-program. On the basis of the execution of the sub-program, the numerical controller controls position-controlled shafts of a machine tool controlled by the numerical controller. The sub-program contains instruction sets which are retrieved sequentially one after the other by the numerical controller. The numerical controller only executes the retrieved instruction sets when the instruction sets comply with permitted boundary conditions. Otherwise, the instruction sets are not executed. Before executing the sub-program and while executing the system program, the numerical controller receives information defining the permitted boundary conditions via an interface protected from unauthorized access.

11 Claims, 6 Drawing Sheets

(56) References Cited

U.S. PATENT DOCUMENTS

| | | |
|---|---|---|
| 2013/0246744 A1 | 9/2013 | Farrell et al. |
| 2016/0098035 A1 | 4/2016 | Sinn et al. |
| 2016/0103447 A1 | 4/2016 | Sinn et al. |
| 2018/0004191 A1 | 1/2018 | Rosenbaum |
| 2018/0203430 A1* | 7/2018 | Kageyama ......... G05B 19/4067 |
| 2020/0174436 A1 | 6/2020 | Bitterolf et al. |
| 2021/0365001 A1 | 11/2021 | Bretschneider et al. |

FOREIGN PATENT DOCUMENTS

| | | | |
|---|---|---|---|
| CN | 104364771 A | 2/2015 | .............. G06F 11/34 |
| CN | 105144006 A | 12/2015 | ......... G05B 19/4068 |
| CN | 105164595 A | 12/2015 | ......... G05B 19/4093 |
| CN | 107291045 A | 10/2017 | ......... G05B 19/4093 |
| CN | 109844658 A | 6/2019 | ........... G05B 19/042 |
| EP | 3045993 A1 | 7/2016 | ........ G05B 19/4093 |
| EP | 3543811 A1 | 9/2019 | ........ G05B 19/4155 |

* cited by examiner

NUMERICAL CONTROLLER WHICH CAN BE PARAMETRISED BY THE MACHINE MANUFACTURER

CROSS-REFERENCES TO RELATED APPLICATIONS

This application is the U.S. National Stage of International Application No. PCT/EP2020/075758, filed Sep. 15, 2020, which designated the United States and has been published as International Publication No. WO 2021/058333 A1 and which claims the priority of European Patent Application, Serial No. 19200125.3, filed Sep. 27, 2019, pursuant to 35 U.S.C. 119(a)-(d).

BACKGROUND OF THE INVENTION

The present invention is based on an operating method for a numerical controller,
  wherein the numerical controller executes a system program,
  wherein the numerical controller executes a part program while executing the system program and on the basis of the execution of the part program actuates position-controlled axes of a machine tool that is controlled by the numerical controller,
  wherein the part program has command sets that are retrieved sequentially one after the other by the numerical controller,
  wherein the numerical controller only then executes the retrieved command sets if the command sets comply with permitted boundary conditions, and otherwise it does not execute the command sets,
  wherein prior to executing the part program while executing the system program the numerical controller receives via an Interface, which is protected from unauthorized access, information that determines the permitted boundary conditions.

The present Invention is furthermore based on a system program for a numerical controller, wherein the system program comprises machine code that can be executed by the numerical controller, wherein the execution of the machine code by the numerical controller causes the numerical controller to perform an operating method of this type.

The present invention is furthermore based on a numerical controller, wherein the numerical controller is programmed with a system program of this type with the result that the numerical controller performs an operating method of this type.

The present invention is furthermore based on a machine tool,
  wherein the machine tool has multiple position-controlled axes by means of which a tool of the machine tool can be moved relative to a workpiece that is to be processed,
  wherein the machine tool has a numerical controller of this type and the position-controlled axes are actuated by said numerical controller.

Numerical controllers, the associated machine tools and the operating modes for numerical controllers and machine tools are generally known.

During the manufacture of a machine tool, the manufacturer of the machine tool finishes the machine tool on the one hand with respect to its construction, in other words for example a lathe or a milling machine. Furthermore, within the scope of the structural design of the machine tool, the manufacturer determines how many and which position-controlled axes the machine tool has. For example, the manufacturer can manufacture a milling machine having three position-controlled axes by means of which, although a tool of the machine tool can be positioned in three-dimensional space relative to a workpiece that is being processed, said tool cannot however be oriented in a rotational manner. Alternatively, the manufacturer can for example manufacture a milling machine having four or five position-controlled axes by means of which in addition to the translational positioning in three dimensions the tool can also be oriented relative to the workpiece in a rotational manner in one or two orientations. Other embodiments of the machine tool are also possible, for example also machine tools having more than two rotational axes.

The manufacturer of the machine tool uses a numerical controller so as to control the machine tool that is manufactured by the manufacturer. The numerical controller can usually be used universally, in other words irrespectively of whether the machine tool is a lathe, a milling machine or any other machine tool. The numerical controller is therefore in general capable of suitably controlling each of the mentioned machine tools (and also other machine tools). However, not all functions that are offered by the numerical controller can be used in an expedient manner or at all for the machine tool for which the numerical controller is specifically used. Some functions and in particular some combinations of functions can even be damaging. As a result, a large number of parameters of the numerical controller are adjustable, wherein it depends upon the specific use of the numerical controller which parameters are expedient. It is possible by means of the parameters, for example, to determine whether a specific function or a specific combination of functions can or cannot be retrieved or performed. Alternatively or in addition thereto, it is possible by means of the parameters to determine how a specific function or a specific combination of functions is performed.

In order to ensure that only "useful" functions and the like of the numerical controller are used, instructions are provided in manuals and the like as to which functions are expedient and can be used and in so doing which conditions may have to be met. In this manner, the manufacturer of the machine tool avoids their liability risk since they provide explicit instructions in the manual or in the operating instructions as to which functions may be used and which functions may not be used. In contrast, it is not in principle excluded that functions that cannot be used or cannot be used in an expedient manner are still retrieved by the numerical controller. In the event that functions of this type are nonetheless inadvertently retrieved, this can therefore result in inferior machining processes or even damage to the machine tool or the workpiece.

It is furthermore known to activate certain software options retrospectively or to integrate them retrospectively into the numerical controller. This integration is performed by the end customer, in other words the buyer or operator of the machine tool. The manufacturer of the machine tool has no control over which of the software options is activated or integrated retrospectively and whether and possibly how they are used. As previously explained, the manufacturer can only provide instructions in manuals or the like as to which functions are expedient and can be used and in so doing which conditions, if any, have to be met.

The publication EP3543811A1 discloses a numerical controller that executes a utility program under the control of a system program. Within the scope of executing the utility program by means of at least one processor facility having at least one first clock rate, the numerical controller determines set values for position-controlled axes of a machine that is controlled by the numerical controller and actuates the position-controlled axes according to the respectively determined set values. The numerical controller stores for each of the resources of the numerical controller whether and, if applicable, to what extent they are released or whether they are blocked. The numerical controller determines the set values for the position-controlled axes while using exclusively the released resources.

The publication EP3045993A1 discloses a manufacturing system using a manufacturing machine and a control apparatus so as to generate specific control commands for the manufacturing machine on the basis of manufacturing data. The control apparatus has an analyzing facility that is designed so as, with the aid of a predetermined quality criterion, to decide whether an activated functionality that is already Integrated into the control apparatus is used so as to convert the manufacturing data into the specific control commands or an alternative functionality that is provided in a database outside the control apparatus or in a non-activated form in the control apparatus.

The publication US2006/0064385A1 discloses a system for selling CNC program licenses via the internet. A host computer Is connected via the internet to a computer numerical controller that controls a CNC machine. An encrypted program is stored in the controller and a prepaid license is required for said encrypted program in order for the encrypted program to be first encrypted before the program can be executed by the controller.

The object of the present invention consists in creating possibilities by means of which the manufacturer of the machine tool can ensure that of the functions that are in principle available to the numerical controller only those functions can be used that are expedient in the case of machine tool in which the numerical controller is specifically being used.

SUMMARY OF THE INVENTION

The object is achieved by an operating method for a numerical controller as set forth hereinafter. Advantageous embodiments of the operating method are the subject matter of dependent claims.

In accordance with the invention, an operating method of the type mentioned in the Introduction is designed by virtue of the fact that the numerical controller only then executes the retrieved command sets if the command sets comply with permitted boundary conditions, and otherwise it does not execute the command sets, that prior to executing the part program while executing the system program the numerical controller receives via an interface, which is protected from unauthorized access, information that determines the permitted boundary conditions, and that it is determined by means of at least one of the boundary conditions for combinations of functions of the numerical controller whether they are released or blocked.

As a consequence, it is possible that the manufacturer of the machine tool—the manufacturer knowing the Information regarding access to the protected interface—determines the permitted boundary conditions, whereas the end customer and operator of the machine tool—who do not know this information—must accept the permitted boundary conditions as they are determined by the manufacturer of the machine tool.

It is also possible to determine in this manner functions that are not yet available in the numerical controller in their basic state, in other words without the Integration of at least one software option. If, for example, the numerical controller in its basic state offers the functions A, B, C and D and it is known that the functions E, F and G can be implemented in addition by means of a software option, then the manufacturer of the machine tool can determine for example that the functions A and B are blocked and furthermore also that the functions F and G are blocked. In such a case, without previously integrating the mentioned software option the end customer and operator of the machine tool can only choose between the functions C and D and after Integrating the mentioned software option can only choose between the functions C, D and E. As a result, the manufacturer of the machine tool consequently has the possibility of setting the capabilities of the numerical controller. A more or less quantitative adjustment of the performance of the numerical controller is therefore not performed, in other words how quickly the numerical controller performs certain tasks. On the contrary, a qualitative adjustment of the performance of the numerical controller is performed, in other words whether it performs certain tasks at all or not.

One of the boundary conditions determines whether combinations of functions of the numerical controller are released or blocked.

Further boundary conditions can be specified as required.

For example, it is often possible by means of at least one of the boundary conditions to determine a value range for a system variable of the numerical controller. In this case, it is possible that the numerical controller receives as Information a minimum value and/or a maximum value for the system variable.

Furthermore, it is often possible by means of at least one of the boundary conditions to determine a value range for a correction of dimensions of a tool of the machine tool. In this case, it is possible that the numerical controller receives as information a minimum value and/or a maximum value for the correction of the dimensions.

Furthermore, it is often possible by means of at least one of the boundary conditions to determine how corners of the path are ground away as a tool moves along a path relative to a workpiece that is to be processed by means of the tool, said path being determined by the part program. In this case, it is possible that the numerical controller receives Information regarding how the corners are ground away.

Furthermore, it is often possible by means of at least one of the boundary conditions to determine how the part program is generated from a CAD data set. Alternatively or in addition thereto, it is possible by means of at least one of the boundary conditions to also determine how the CAM-generated part program is processed, for example, compressed. In this case, it is possible that the numerical controller receives information regarding how the part program is generated and/or processed.

Furthermore, it is often possible by means of the command sets of the part program to determine both the translational position and also the rotational orientation of a tool of the machine tool relative to a workpiece that is to be processed. In this case, it is often possible by means of at least one of the boundary conditions to determine how, in the case of a combined change of a translational position and rotational orientation, the changes in the translational position and the rotational orientation are coordinated with one another. In this case, it Is possible that the numerical controller receives information regarding how the changes in the translational position and the rotational orientated are coordinated with one another.

Furthermore, it is often possible by means of at least one of the boundary conditions for an actuation of at least one of the position-controlled axes of the machine tool to be dynamically blocked or restricted depending upon the operating state of the machine tool. In this case, it is possible that the numerical controller receives information regarding in which operating states of the machine tool the actuation of the at least one of the position-controlled axes of the machine tool is blocked or restricted.

Furthermore, it is often possible by means of at least one of the boundary conditions to determine the manner in which deviations are compensated when positioning and/or orienting a tool of the machine tool relative to a workpiece that is to be processed. In this case, it is possible that the numerical controller receives information regarding the manner of compensation. The manner of compensation can determine as required the functional progression and/or limits of the compensation.

The object is furthermore achieved by a system program of the type mentioned in the introduction, which system program is designed in such a manner that the execution of the machine code by the numerical controller causes the numerical controller to perform an operating method in accordance with the invention.

The object is furthermore achieved by a numerical controller of the type mentioned in the introduction which numerical controller is programmed with a system program in accordance with the invention with the result that the numerical controller performs an operating method in accordance with the invention.

The object is furthermore achieved by a machine tool having a numerical controller designed in accordance with the invention.

BRIEF DESCRIPTION OF THE DRAWING

The above described characteristics, features and advantages of this invention and how these are achieved are more clearly and more precisely understandable in conjunction with the following description of the exemplary embodiments that are further explained in conjunction with the drawings, in which, in a schematic view.

DETAILED DESCRIPTION OF PREFERRED EMBODIMENTS

Figure 1:
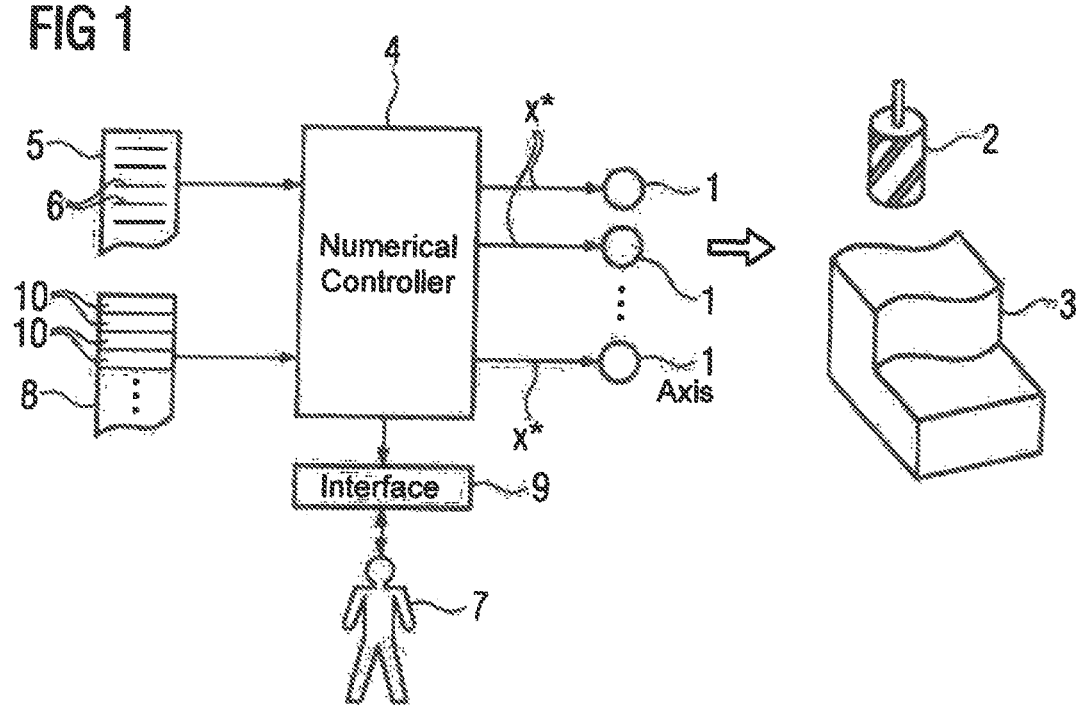
FIG. 1 shows a machine tool.

In accordance with FIG. 1, a machine tool has multiple position-controlled axes 1. A tool 2 of the machine tool is moved relative to a workpiece 3 by means of the position-controlled axes 1. The workpiece 3 is processed by moving the tool 2. The movement is performed in a position-controlled manner. The number of position-controlled axes 1 can be according to requirements. Often three to eight position-controlled axes 1 are provided.

The machine tool furthermore has a numerical controller 4. By means of the numerical controller 4, the position-controlled axes 1 are actuated and as a result the tool 2 is moved relative to the workpiece 3. The numerical controller 4 is programmed with a system program 5. The system program 5 comprises machine code 6 that can be executed by the numerical controller 4. On the basis of the numerical controller 4 being programmed with the system program 5, the numerical controller 4 executes the machine code 6. The execution of the machine code 6 by the numerical controller 4 causes the numerical controller 4 to perform an operating method that is further explained below in conjunction with FIG. 2. The numerical controller 4 performs the operating method that Is explained below, in other words while executing the system program 5.

Figure 2:
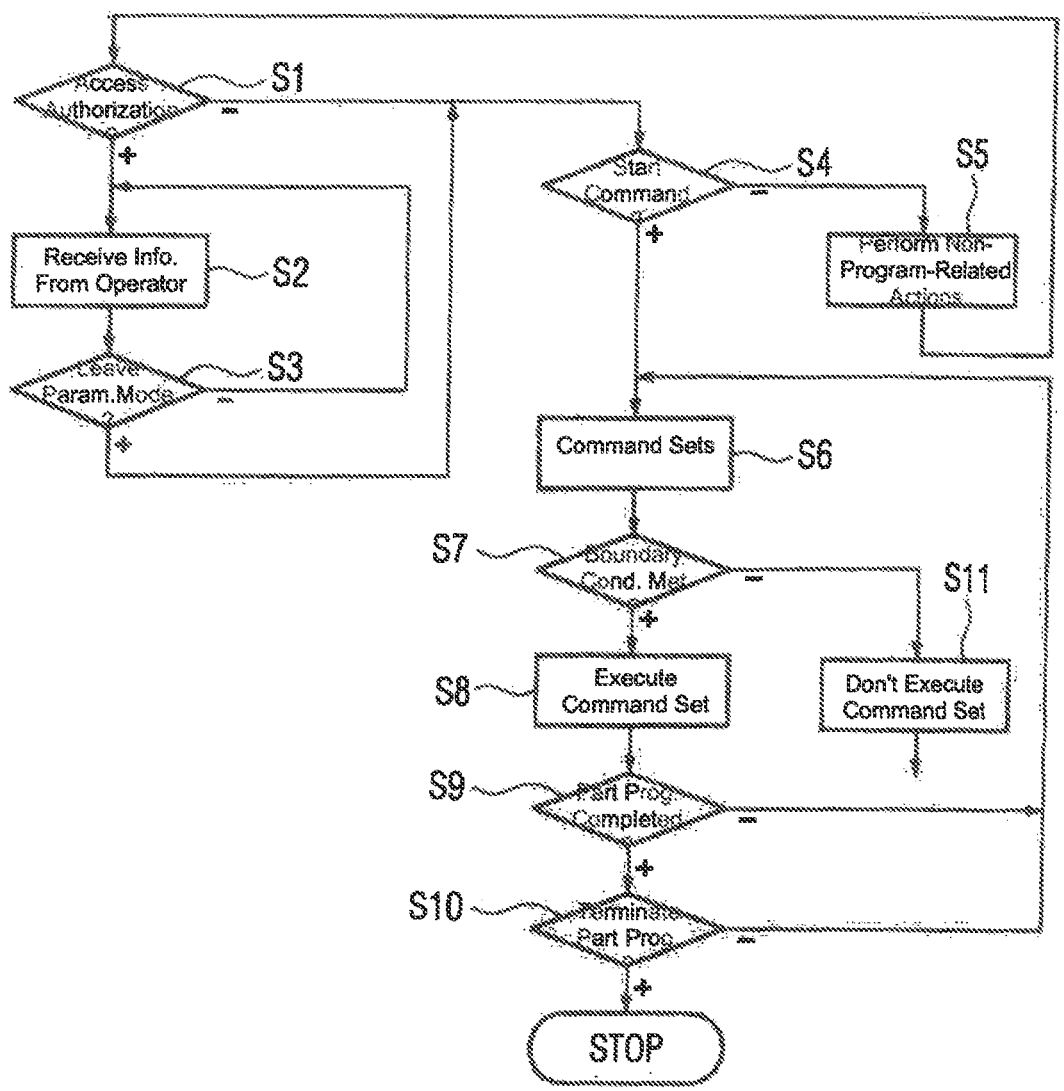
FIG. 2 shows a flow diagram.

In accordance with FIG. 2, the numerical controller 4 performs a check within the scope of executing the system program 5, initially in a step S1, as to whether the numerical controller is in a parameterization mode. In particular, the numerical controller performs a check in step S1 as to whether an operator 7 has provided the numerical controller 4 with access authorization, for example a combination of user name and password. The numerical controller 4 only proceeds to a step S2 and thus Into the parameterization mode if it receives the access authorization.

In step S2, the numerical controller 4 receives Information I from the operator 7. The information I determines which boundary conditions are permitted for the subsequent execution of a part program 8. Possible boundary conditions will be further explained later.

Information I is provided to the numerical controller 4 by the operator 7 via an interface 9. Owing to the fact that the numerical controller 4 only performs the step S2 If said numerical controller has previously received the access authorization in step S1, the interface 9 is consequently an Interface which is protected from unauthorized access.

In a step S3, the numerical controller 4 performs a check as to whether it is to leave the parameterization mode, for example on the basis of a log-out command from the operator 7. Depending upon the result of the check performed in step S3, the numerical controller 4 returns to the step S2 or proceeds to a step S4.

If the numerical controller 4 does not receive the access authorization in step S1, the numerical controller 4 proceeds directly to the step S4. In step S4, the numerical controller 4 performs a check as to whether the numerical controller has received a start command from the operator 7 so as to execute the part program 8. If this is not the case, the numerical controller 4 returns to the step S1 via a step S5. In step S5, it is possible to perform actions that are not directly associated with the execution of the part program 8 and also are not directly associated with the specification of the boundary conditions. On the other hand, if the numerical controller 4 receives the start command, the numerical controller 4 proceeds to a step S6.

According to the illustration in FIG. 1, the part program 8 has command sets 10. The command sets 10 in general comprise standardized G-codes and where appropriate in addition also commands (functions) that are especially available for the numerical controller 4. Furthermore, both the G-codes and also the special functions can comprise setting parameters which influence their behavior. The command sets 10 are retrieved by the numerical controller 4 sequentially one after the other and—at least in general—executed in such a manner. Specifically, the numerical controller 4 calls up the first command set when executing the step S6 for the first time. The numerical controller then performs a check in a step S7 as to whether the retrieved command set 10 fulfills the permitted boundary conditions. If this is the case, the numerical controller 4 proceeds to a step S8 in which the numerical controller 4 performs the retrieved command set 10. The execution of step S8 can in particular be associated with the actuation of the position-controlled axes 1.

In a step S9, the numerical controller 4 performs a check as to whether it has completely executed the part program 8, in other words has retrieved all command sets 10 of the part program 8. If this is not the case, the numerical controller 4 returns to the step S6. When the execution of the step S6 is repeated, the numerical controller 4 now retrieves the next command set 10 and executes it. If the numerical controller 4 establishes in step S9 that it has completely executed the part program 8, the numerical controller proceeds to a step S10. In step S10, the numerical controller 4 performs a check as to whether the execution of the part program 8 is to be terminated, for example because the numerical controller has received a stop command or because the numerical controllers should only execute the part program 8 once. If the execution of the part program is not to be terminated, the numerical controller 4 returns to the step S6. During this execution of step S6, the numerical controller 4 retrieves the first command set 10 of the part program 8 again and executes it.

This step sequence is performed if the numerical controller 4 establishes in each case during the check performed in step S7 that the permitted boundary conditions are fulfilled. On the other hand, as soon as this is not the case, the numerical controller 4 proceeds to a step S11. In step S11, a different response to the execution of the retrieved command set 10 is undertaken. In particular, the retrieved command set 10 is consequently not executed.

The step S11 response can be as required. In some cases, it is possible that only the command set 10 itself is not executed and the numerical controller returns to the step S6. In other cases, it can be expedient or necessary to output a corresponding message to the operator 7 and/or to terminate the further execution of the part program 8. Which of these measures is to be undertaken depends upon the circumstances of the individual case. However, in each case, the command set 10 that fails the check performed in step S7 is not executed.

Some of the boundary conditions which can be permitted in step S2 and the compliance of which is checked in step S7 are explained below.

Most of the command sets 10 are simple movement commands ("position the tool 2 relative to the workpiece 3 at the position p" or "position the tool 2 relative to the workpiece 3 at the position p and simultaneously orient the tool 2 relative to the workpiece 3 with orientation o"). In this case, the respective command set 10 determines directly or indirectly for the position-controlled axes 1 for the translational movement of the tool 2 relative to the workpiece 3 a sequence of position set values x* that extend from the instantaneous position p, at which the tool 2 is located relative to the workpiece 3, up to the position p of the tool 2 relative to the workpiece 3, said position p being determined by the command set 10. A similar situation applies for the orientation o of the tool 2 relative to the workpiece 3.

Figure 3:
FIG. 3 shows a movement range.
Figure 4:
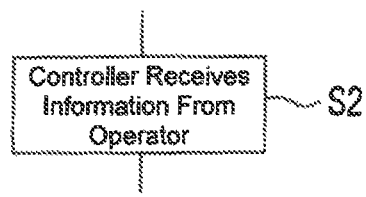
FIG. 4 shows a step of the flow diagram shown in FIG. 2,
FIG. 5 a tool.

As far as the numerical controller 4 is concerned, the position reference values x* of a specific position-controlled axis 1 must lie between a theoretical minimum value MIN and a theoretical maximum value MAX, according to the illustration in FIG. 3. The region between the theoretical minimum value MIN and the theoretical maximum value MAX represents a theoretical movement range. The theoretical minimum value MIN and the theoretical maximum value MAX can be very small or very large where appropriate. However, within the scope of the specific machine tool, the position-controlled axis 1 can or may be moved, for example, only between an actual minimum value min and an actual maximum value max, in particular on the basis of a corresponding dimensioning and design of the machine tool. Otherwise there is, for example, a risk of collision or impacting against a stop. The region between the actual minimum value min and the actual maximum value max represents an actual movement range. In step S2, for example, according to the illustration in FIG. 4, the operator 7 can provide the numerical controller 4 with the actual minimum value min and/or the actual maximum value max for the corresponding position-controlled axis 1. It is naturally possible to provide the corresponding specification for each position-controlled axis 1 individually. Similar specifications are also possible for other system variables of the numerical controller 4. Examples of system variables of this type are zero offsets and offsets. Zero offsets and offsets can occur for example when the workpiece 3 is clamped slightly offset in a clamping of the workpiece 3. The zero offset as such is dependent in this case in general upon the actual clamping of the workpiece 3.

Figure 5:
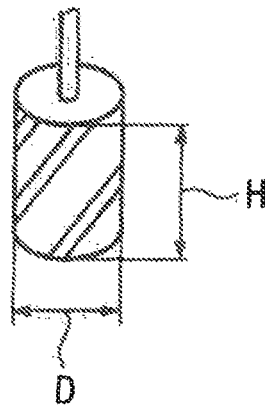

It is possible by means of other command sets of the command sets 10 to select for example a specific tool 2. In this case, on the one hand the corresponding tool 2 is taken from a tool magazine (not illustrated). According to the illustration in FIG. 5, the tool 2 has specific dimensions D, H, for example, in the case of the milling tool illustrated in FIG. 5 a diameter D and a height H. The corresponding values are stored in general in the numerical controller 4.

Figure 6:
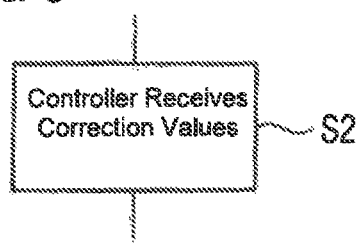
FIG. 6 shows a step of the flow diagram shown in FIG. 2,
FIG. 7 a path.

During the course of the operation of the tool 2, the dimensions D, H can change slightly—in particular as a result of wear. It is also possible that right from the beginning a tool 2 is used that has slightly different dimensions D, H than an originally planned tool 2. In order to still be able to process the workpiece 3, it is therefore usual to be able to determine to the numerical controller correction values 6D, 6H for the dimensions D, H of the tool 2. It is also possible in a step S2 to specify a minimum value and/or a maximum value for the correction values 6D, 6H according to the Illustration in FIG. 6.

Figure 7:
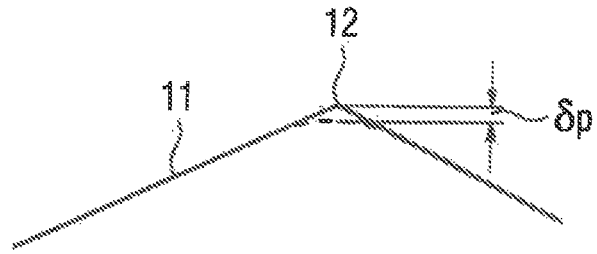
Figure 8:
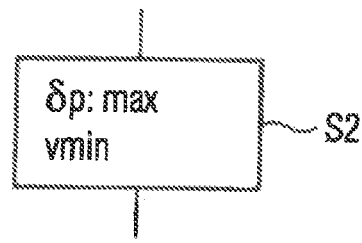
FIG. 8 shows a step of the flow diagram shown in FIG. 2,
FIG. 9 the creation of the part program.

On the basis of the sequence of the command sets 10 of the part program 8, the tool 2 is moved relative to the workpiece 3 according to the illustration in FIG. 7 along a path 11 that is determined by the part program 8. The path 11 can have a corner 12 at specific sites. If the corner 12 is to be approached exactly, the speed at which the path 11 is traversed must be reduced to 0 In the corner 12. Only then can the tool 2 be accelerated again relative to the workpiece 3. However, for reasons relating to the processing, the speed should remain above the minimum value vmin. As a consequence, the path 11 is slightly ground away in the region of the corner 12. This is Indicated by the dashed line in FIG. 7. A certain positioning error δp results from the grinding away. The magnitude of the positioning error δp, for example, depends upon according to which algorithm the set position values x* are determined for the different axes 1 and to which value vmin the speed the tool 2 is reduced in the region of the corner 12 as it moves along the path 11. This and other variables determine how the corner 12 is ground away. These values—in other words the maximum permitted positioning error δp and/or the minimum speed vmin of the tool 2 that is to be maintained—can be specified in a step S2 according to the illustration in FIG. 8. As a result, they determine thereby how the corner 12 (and also other corners 12) are ground away.

Figure 9:
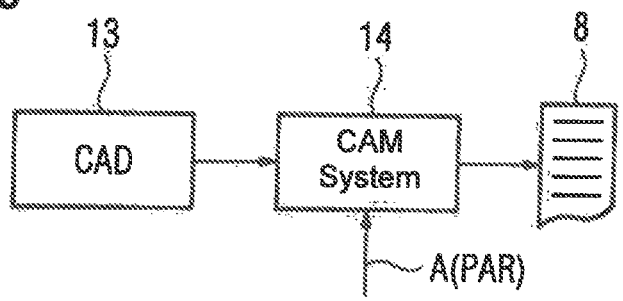
Figure 10:
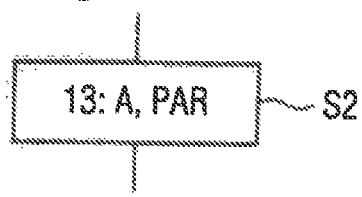
FIG. 10 shows a step of the flow diagram shown in FIG. 2.

According to the illustration in FIG. 9, the part program 8 is created by means of a CAM system 14 with the aid of a CAD data set 13. The CAM system 14 creates the part program 8 with the aid of a specific algorithm A. In so doing, both different algorithms A are possible and also the algorithms A for their part can be parameterized by determining corresponding parameters PAR. According to the illustration in FIG. 10, it is possible in step S2 to determine the desired algorithm A and the associated parameters PAR. By appropriate data exchange between the numerical controller 4 and the CAM system 14, it is therefore possible to ensure that the desired algorithm A and the associated parameters PAR are used during the creation of the part program 8. As a result, it Is consequently determined how the part program 8 is generated from the CAD data set 13. Completely similar procedures are possible with regard to how the generated part program 8 is processed, in particular in the numerical controller 4 itself.

Figure 11:
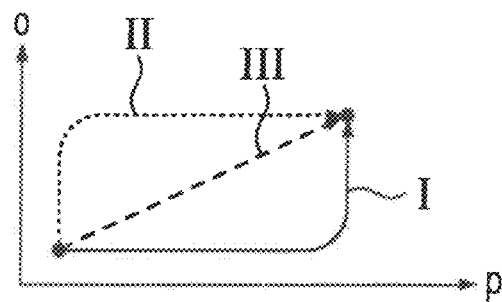
FIG. 11 shows a position orientation program.
Figure 12:
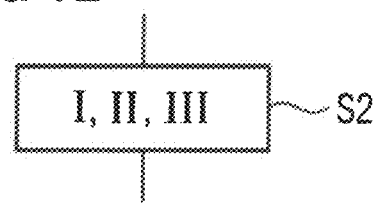
FIG. 12 shows a step of the flow diagram shown in FIG. 2.

As mentioned in the introduction, in some machine tools it is not only possible to determine the translational position p but rather it is also possible to determine the rotational orientation o of the tool 2 relative to the workpiece 3. It is therefore possible according to the illustration in FIG. 11 that from one command set 10 to the next command set 10 both the translational position p and also the rotational orientation o change. However, this does not yet determine the manner in which the translational position p and the rotational orientation o are changed. For example, it is alternatively possible to perform the changes in accordance with a type I, a type II or a type III. In the case of type I, the new position p is first approached and only then is the orientation o changed. In the case of type II, the opposite occurs. In the case of type III, a uniform change in the orientation o takes place together with the change in the position p. Other types are also conceivable and possible. According to the illustration in FIG. 12, it is possible, for example, to determine the appropriate type I to III (or also to determine a different type). It is also possible in step S2 to determine how the changes in the translational position p and the rotational orientation o are coordinated with one another. For the sake of good order, it is mentioned that in conjunction with the FIGS. 11 and 12 the translational position p and the rotational orientation o can be vectors. For example, the translational position p can each have a dedicated value for the three coordinates of a Cartesian coordinate system. Similar thereto applies for the rotational orientation o.

Figure 13:
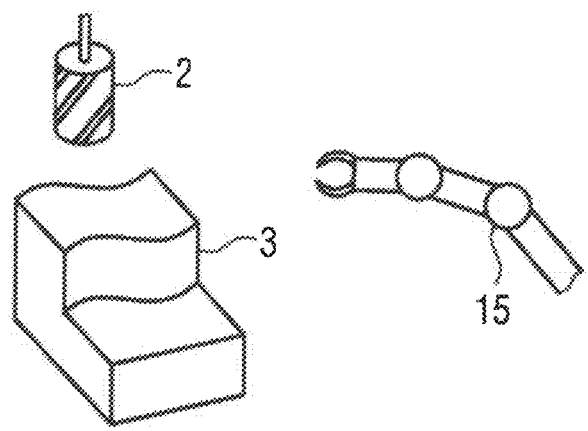
FIG. 13 shows a machine tool that has been modified in comparison to FIG. 1.

FIG. 13 illustrates purely by way of example an embodiment in which, in addition to the tool 2, a further element 15 is also provided. The further element 15 can be moved relative to the workpiece 3 independently from the tool 2.

The further element 15 can be, for example, a robotic arm according to the schematic illustration in FIG. 13. However, other embodiments are also possible.

Figure 14:
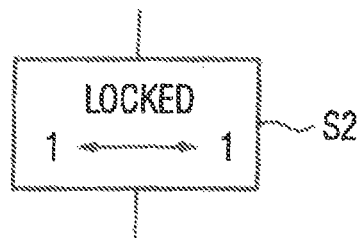
FIG. 14 shows a step of the flow diagram shown in FIG. 2.

In order to avoid collisions, it may be required, for example, that the further element 15 may only be moved when the tool 2 and/or the workpiece 3 are not being moved. Where appropriate, the reverse may also be required. In this case, according to the illustration in FIG. 14, it is possible to specify in step S2, for example, that the position set points x* for those position-controlled axes 1, by means of which the further element 15 is moved, may not be changed, while the position set points x* for those position-controlled axes 1, by means of which the tool 2 and/or the workpiece 3 are moved, change and conversely. In this case, the movements are therefore locked with respect to one another (LOCKED). Therefore, the actuation of at least one of the position-controlled axes 1 of the machine tool is blocked as long as specific other position-controlled axes of the position-controlled axes 1 of the machine tool are moved. In lieu of a complete locking, it is also possible to realize dynamic restrictions in the movement range.

Naturally, other conditions or operating states are also possible under which a method can block or restrict specific axes 1 of the machine tool.

Figure 15:
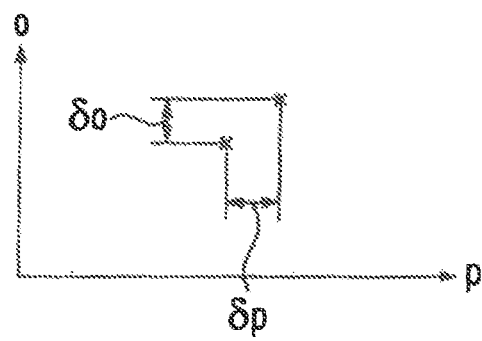
FIG. 15 shows a position orientation program.

When the tool 2 is being moved relative to the workpiece 3, it is not only possible for dynamic but also for static deviations δp of the positioning p to occur. If the tool 2 is to be positioned at a specific position p and/or in a specific orientation o relative to the workpiece 3, for example according to the Illustration in FIG. 15, it can thus happen that the tool 2 is actually positioned relative to the workpiece 3 at an actual position which deviates from the actually desired position by the deviation δp. In a similar manner, it is possible that the tool 2 is actually oriented relative to the workpiece 3 in an actual orientation that deviates from the actually desired orientation by a deviation δo. For the sake of good order, it is mentioned that in conjunction with FIG. 15 the translational position p and the rotational orientation o and also the associated deviations δp, δo can be vectors. For example, the translational position p can have a dedicated value for each of the three coordinates of a Cartesian coordinate system. Similar thereto applies for the rotational orientation o.

Figure 16:
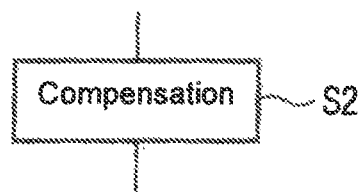
FIG. 16 shows a step of the flow diagram shown in FIG. 2.

Various measures are known for compensating deviations δp, δo of this type. For example, it is generally known that, for example, a so-called spindle pitch error compensation, a sag compensation or a volumetric compensation can be carried out. In principle, the type of compensation can be freely selected. It can often also be selected in the part program 8 by a corresponding command set 10 or it can also be switched back off. However, it is possible that compensation data for one of the mentioned types of compensation is already stored within the numerical controller 4. In this case, it would often not only be pointless, but rather even counterproductive, to select a different type of compensation. It is therefore possible that, according to the Illustration in FIG. 16, certain types of compensation are blocked in step S2, so that, for example, only a single remaining type of compensation can be selected or is possibly even permanently preset. In this case, in step S7, the selection of other types of compensation and possibly even a switch-off of the remaining type of compensation are ignored. This situation exemplifies a case in which command set 10 itself is not executed in step S11, but a return is then made to the step S6.

Figure 17:
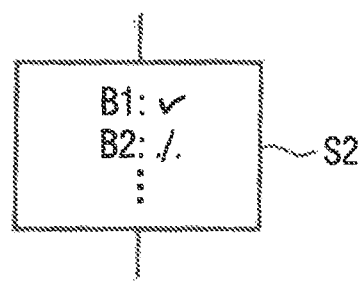
FIG. 17 shows a step of the flow diagram shown in FIG. 2.

As furthermore already mentioned, the numerical controller 4 as such can in general be used universally, whereas the machine tool is based on a specific technology, for example "milling" or "turning". It is therefore possible, according to the illustration in FIG. 17, to block those commands in step S2 which are only relevant for the technology that has not been Implemented. In step S2, for example, all commands can be blocked that are only relevant for turning if the machine tool is based on the "milling" technology. Examples of such functions are the programming of cycles for facing and longitudinal turning or for thread cutting. Functions of this type can be individually released or blocked as required. The same applies for combinations of functions.

The mentioned possibilities are only exemplary. However, other restrictions are also possible. For example, it Is also possible to determine in step S2 whether positions p have been specified to the numerical controller 4 in a metric system or In a system based on inches (=2.54 cm).

To summarize, the present invention thus relates to the following facts:

A numerical controller 4 executes a system program 5. While executing the system program 5, the numerical controller 4 executes a part program 8. On the basis of the execution of the part program 5, said numerical controller actuates position-controlled axes 1 of a machine tool that is controlled by the numerical controller 4. The part program 8 has command sets 10 that are retrieved sequentially one after the other by the numerical controller 4. The numerical controller 4 only executes the retrieved command sets 10 if the command sets 10 comply with permitted boundary conditions. Otherwise, said numerical controller does not execute the command sets 10. Prior to executing the part program 8 while executing the system program 5, the numerical controller 4 receives via an interface 9, which is protected from unauthorized access, information I that determines the permitted boundary conditions.

The present invention has many advantages. In particular, the manufacturer of the machine tool is given the opportunity of "tailoring" the numerical controller 4 to suit the specific machine tool that is manufactured by the manufacturer. The manufacturer can Individually allow or block specific program commands, restrict value ranges for variables or configuration data and also allow or block specific combinations of functions. The risk of damage as a result of incorrect use or an "unsultable" part program 8 is avoided or at least reduced.

Although the invention has been further illustrated and described in detail with the aid of the preferred exemplary embodiment, the Invention Is not limited by the disclosed examples and other variations can be derived therefrom by the person skilled in the art without departing from the protective scope of the invention.

What is claimed is:

1. A method for operating a numerical controller, comprising:
executing with the numerical controller a system program;
while executing the system program, executing with the numerical controller a part program which actuates position-controlled axes of a machine tool that is controlled by the numerical controller;
retrieving with the numerical controller sequentially command sets of the part program, with the command sets comprising functions that are available especially for the numerical controller;
executing the retrieved functions with the numerical controller only when the retrieved functions comply with permitted boundary conditions, while otherwise not executing the retrieved functions;
receiving with the numerical controller, prior to executing the part program while executing the system program, information that determines the permitted boundary conditions via an interface that is protected from unauthorized access; and
determining based on at least one of the permitted boundary conditions which combinations of the retrieved functions are released or blocked.

2. The method of claim 1, further comprising
defining based on at least one of the permitted boundary conditions a value range for a system variable of the numerical controller, and
transmitting to the numerical controller as the information a minimum value or a maximum value, or both, for the system variable.

3. The method of claim 1, further comprising:
defining based on at least one of the boundary conditions a value range for a correction of dimensions of a tool of the machine tool; and
transmitting to the numerical controller as the information a minimum value or a maximum value, or both, for the correction of the dimensions.

4. The method of claim 1, further comprising:
defining based on at least one of the boundary conditions a way to grind off corners of a path determined by the part program as a tool of the machine tool along the path relative to a workpiece to be machined by the tool; and
transmitting to the numerical controller as the information the way to grind off the corners.

5. The method of claim 1, further comprising:
defining based on at least one of the boundary conditions a way to generate the part program from a CAD data set or to execute a generated part program; and
transmitting to the numerical controller as the information the way to generate or execute the part program.

6. The method of claim 1, further comprising:
defining based on the command sets of the part program both a translational position and a rotational orientation of a tool of the machine tool relative to a workpiece that is to be processed;
defining based on at least one of the boundary conditions a way to, for a combination of changes of the translational position and the rotational orientation, coordinate the changes of the translational position and the rotational orientation with one another; and
transmitting to the numerical controller as the information the way to coordinate the changes of the translational position and the rotational orientation with one another.

7. The method of claim 1, further comprising:
dynamically blocking or restricting based on at least one of the boundary conditions an actuation of at least one of the position-controlled axes of the machine tool depending upon an operating state of the machine tool; and
transmitting to the numerical controller the information about the operating state of the machine tool that causes an actuation of the at least one position-controlled axis of the machine tool to be dynamically blocked or restricted.

8. The method of claim 1, further comprising:
defining based on at least one of the boundary conditions a way to compensate deviations during positioning or orienting a tool of the machine tool relative to a workpiece that is to be processed; and
transmitting to the numerical controller as the information the way to compensate the deviations.

9. A system program for a numerical controller, wherein the system program comprises machine code stored on a non-transitory medium, wherein the machine code when read into a memory of the numerical controller and executed by a microprocessor of the numerical controller, causes the numerical controller to perform a method as set forth in claim 1.

10. A numerical controller, wherein the numerical controller is programmed with a system program as set forth in claim 9.

11. A machine tool, comprising:
- a plurality of position-controlled axes constructed to move a tool of the machine tool relative to a workpiece to be processed; and
- the numerical controller of claim 10, configured to control the plurality of position-controlled axes.

\* \* \* \* \*